US011427077B2

(12) United States Patent
KYE et al.

(10) Patent No.: US 11,427,077 B2
(45) Date of Patent: Aug. 30, 2022

(54) SUPPORT ASSEMBLY TYPE BAFFLE

(71) Applicant: Dong Hee Industrial Co., Ltd., Ulsan (KR)

(72) Inventors: Tae Hong KYE, Gyeonggi-do (KR); Dong Kun Lee, Gyeonggi-do (KR); Se Hun Ko, Incheon (KR); Min Kyu Lee, Seoul (KR)

(73) Assignee: Dong Hee Industrial Co., Ltd., Ulsan (KR)

( * ) Notice: Subject to any disclaimer, the term of this patent is extended or adjusted under 35 U.S.C. 154(b) by 167 days.

(21) Appl. No.: 16/956,007

(22) PCT Filed: Dec. 19, 2018

(86) PCT No.: PCT/KR2018/016209
§ 371 (c)(1),
(2) Date: Jun. 19, 2020

(87) PCT Pub. No.: WO2019/124959
PCT Pub. Date: Jun. 27, 2019

(65) Prior Publication Data
US 2020/0384855 A1 Dec. 10, 2020

(30) Foreign Application Priority Data

Dec. 19, 2017 (KR) .......................... 1020170174709

(51) Int. Cl.
*B60K 15/077* (2006.01)
*B60K 15/03* (2006.01)

(52) U.S. Cl.
CPC .... *B60K 15/077* (2013.01); *B60K 2015/0344* (2013.01); *B60K 2015/0775* (2013.01); *B60K 2015/0777* (2013.01); *B60Y 2306/09* (2013.01)

(58) Field of Classification Search
CPC .......... B60K 15/077; B60K 2015/0775; B60K 2015/0344
See application file for complete search history.

(56) References Cited

U.S. PATENT DOCUMENTS 4,747,388 A * 5/1988 Tuckey ................ F02M 37/106
137/574
7,455,190 B2 * 11/2008 Potter .............. B60K 15/03177
220/4.12
(Continued)

FOREIGN PATENT DOCUMENTS

DE 4336574 A1 5/1995
JP 2007237843 A 9/2007
(Continued)

OTHER PUBLICATIONS

International Search Report dated Apr. 8, 2019.

*Primary Examiner* — Andrew T Kirsch
(74) *Attorney, Agent, or Firm* — Dickinson Wright PLLC

(57) ABSTRACT

A support assembly type baffle is proposed. The baffle may include a baffle body provided in an inner space of a vehicle tank to reduce flow noise, and having a plurality of through holes spaced apart from each other and a fastening portion formed on the inner circumferential surface of the through holes, and a support having a columnar shape, being fitted into the through holes to penetrate the through holes, and having an engagement portion coupled with the fastening portion, formed on the outer circumferential surface thereof, so that the support is fastened to the baffle body in a state of penetrating the baffle body, each of both ends of the support being fixed to two opposite sides of the inner sides of the tank to maintain the shape of the inner space of the tank.

20 Claims, 8 Drawing Sheets

(56) References Cited

U.S. PATENT DOCUMENTS

| | | | | |
|---|---|---|---|---|
| 2012/0227237 A1* | 9/2012 | Tabuchi | ............. | B29C 66/1312 |
| | | | | 248/231.61 |
| 2015/0344183 A1* | 12/2015 | Quant | .................... | B65D 25/20 |
| | | | | 220/567.2 |
| 2016/0200192 A1 | 7/2016 | Tsukahara et al. | | |

FOREIGN PATENT DOCUMENTS

| | | | |
|---|---|---|---|
| JP | 2013060096 | A | 4/2013 |
| JP | 2016036956 | A | 3/2016 |
| KR | 10-0313018 | | 1/2002 |
| KR | 1020000042252 | | 1/2002 |
| KR | 20080026842 | A | 3/2008 |
| KR | 20140048770 | A | 4/2014 |
| KR | 101512932 | B1 | 4/2015 |
| KR | 101512932 | B1 | 4/2015 |
| KR | 20150075116 | A | 7/2015 |
| KR | 101631009 | B1 | 6/2016 |
| KR | 101631009 | B1 | 6/2016 |

\* cited by examiner

SUPPORT ASSEMBLY TYPE BAFFLE

CROSS-REFERENCE TO RELATED APPLICATIONS

This application claims priority to Korean Patent Application No. 10-2017-0174709, filed Dec. 19, 2017, and PCT/KR2018/016209, filed Dec. 19, 2018 the contents of which are incorporated herein by reference in their entirety.

FIELD

The present disclosure relates to a baffle. More particularly, the present disclosure relates to a baffle that may be assembled with a support.

BACKGROUND

Generally, a vehicle is equipped with a tank for storing fluid, such as a fuel tank that stores fuel including gasoline or diesel supplied to a cylinder of an engine or a urea-solution tank for storing urea solution. To be more specific, a baffle is installed in the tank for storing the fluid to prevent noise from being generated when the fluid stored in the tank collides with an inner wall of the tank while being shaken due to the driving of the vehicle.

Meanwhile, in the case of a plastic fuel tank for storing fuel, as the fuel stored in the tank repeatedly expands or contracts due to the effect of external factors such as temperature, the fuel tank may also expand or contract, and consequently, the rigidity of the tank may be reduced. In order to solve the problem, according to the related art, a rigid support is installed in a baffle to be integrated with the baffle and upper and lower surfaces of the rigid support are fused to inner surfaces of upper and lower portions of the tank, thus preventing the rigidity of the tank from being reduced. However, the conventional method is problematic in that it is not easy to design and injection-mold the rigid support integrated with the baffle, and the rigid support may not be freely formed at a desired position in terms of the structure of the baffle.

The foregoing is intended merely to aid in the understanding of the background of the present disclosure, and is not intended to mean that the present disclosure falls within the purview of the related art that is already known to those skilled in the art.

As the related art, Korean Patent Application Publication No. 10-2008-0026842 has been proposed.

BRIEF SUMMARY

The present disclosure has been made to solve the above-mentioned problems and difficulties and relates to a baffle that can be assembled with a support, in which a plurality of through holes is formed in a baffle body, a fastening portion is formed in each through hole, and the baffle body and the support are fastened to each other by inserting the support into the fastening portion, so that the support can be freely installed at a desired position in a tank body, and the work efficiency of assembling the baffle with the support can be improved.

In order to accomplish the above object, the present disclosure provides a baffle that can be assembled with a support, the baffle including a baffle body installed in an inner space of a tank for a vehicle to reduce flow noise, and having a plurality of through holes that are spaced apart from each other, with a fastening portion being formed on an inner circumferential surface of each of the through holes; and a support having a columnar shape, the support being fitted into a through hole to pass through the through hole, the support having on an outer circumferential surface of the support body, an engagement portion that is coupled to the fastening portion, so that the support is fastened to the baffle body while passing through the baffle body, the support being secured at both ends thereof to opposite sides of an inner surface of the tank, respectively, thus supporting the tank to maintain a shape of the inner space of the tank.

The fastening portion may be located in the through hole, may have a shape of a cylinder in which a hollow portion is formed, and may surround the support to be fixedly engaged to the engagement portion when the support is inserted.

The fastening portion may be located in the through hole to be spaced apart from the through hole, and the baffle may further include a connecting portion connected at a first end thereof to an outer surface of the fastening portion and extending at a second end thereof to the baffle body to be connected to an inner surface of the through hole, thus connecting the fastening portion and the baffle body.

The second end of the connecting portion may be connected to the inner surface of the through hole, and may extend to an edge of the baffle body.

The engagement portion may include a plurality of wings formed at opposite sides on an outer surface of the support to protrude in opposite directions.

The engagement portion may include a plurality of first wings formed at a predetermined height of the support, and a plurality of second wings formed at a height to be spaced apart from the first wings.

The fastening portion may be shaped to extend in a longitudinal direction of the support, and an extending length of the fastening portion may be the same as a distance between the first and second wings.

In order to allow the wings of the support to be inserted when the support is inserted into the fastening portion, an insert groove corresponding to a shape of each of the wings may extend from an upper surface of the fastening portion to a lower surface thereof.

A first engagement portion may be formed on an upper surface of the fastening portion to protrude upwards, a second engagement portion may be formed along the hollow portion of the fastening portion to be spaced apart from the first engagement portion, and a first engagement step may be formed between the first engagement portion and the second engagement portion.

A third engagement portion may be formed on a lower surface of the fastening portion to protrude downwards, a fourth engagement portion may be formed along the hollow portion of the fastening portion to be spaced apart from the third engagement portion, and a second engagement step may be formed between the third engagement portion and the fourth engagement portion.

As the support rotates before the second wing of the support is inserted into the insert groove, a first end of the second wing may pass over the first engagement step to be located between the first engagement step and the first engagement portion, and a second end of the second wing may be located between the first engagement portion and the second engagement portion, so that the support may be fastened to the baffle body.

As the support rotates, a first end of the first wing of the support may pass over a second engagement step to be located between the second engagement step and a third engagement portion, and a second end of the first wing may be located between the third engagement portion and a fourth engagement portion, so that the support may be fastened to the baffle body.

After the support and the baffle body are fastened to each other, the wings of the support may be located between the engagement steps of the fastening portion and the plurality of engagement portions, thus preventing the support from being rotated.

After the support and the baffle body are fastened to each other, the first and second wings of the support may be engaged to the lower surface and the upper surface of the fastening portion, thus preventing the support from moving up and down.

Fusion surfaces may be formed on upper and lower ends of the support, respectively, to be fixedly fused to opposite sides of the inner surface of the tank.

A protrusion may be formed on each of the fusion surfaces of the support.

Concave notches may be formed along an edge of the support at a lower point of the fusion surface formed on an upper end of the support and an upper point of the fusion surface formed on a lower end of the support.

The support may extend in a vertical direction of the vehicle, and the fusion surfaces of the support may be fixedly fused to inner surfaces of upper and lower portions of the tank.

A core may be formed between the upper and lower fusion surfaces of the support to connect the upper and lower fusion surfaces.

A plurality of ribs may be formed on opposite sides of the core in a longitudinal direction of the support to protrude in opposite directions.

The plurality of ribs may be arranged in parallel to be spaced apart from each other.

A first end of each of the ribs may be connected to a lower side of the fusion surface formed on the upper end of the support, and a second end of each of the ribs may be connected to an upper side of the fusion surface formed on the lower end of the support.

A connecting surface may be formed at a midpoint between the upper and lower fusion surfaces of the support, and the plurality of ribs may be connected to upper and lower sides of the connecting surface.

According to the present disclosure, a plurality of through holes is formed in a baffle body, a fastening portion is formed in each through hole, and the baffle body and the support are fastened to each other by inserting the support into the fastening portion, so that the support can be freely installed at a desired position in a tank body, whereby the work efficiency of assembling the baffle with the support can be improved.

Furthermore, according to the present disclosure, a fastening portion is not formed along a through hole of a baffle body but is formed to be spaced apart from the through hole by a predetermined distance, and the fastening portion, the through hole, and the baffle body are connected to each other via a connecting portion, thus preventing the fastening portion from being deformed due to shrinkage caused by cooling and molding processes after injection molding is performed.

In addition, according to the present disclosure, a notch is formed at a point adjacent to a fusion surface of a support, so that the rigidity of a portion in which the support and a tank are fixedly fused is higher than that of the tank, thus preventing the tank from being cracked by external shocks and overpressure.

Moreover, according to the present disclosure, a plurality of ribs is not directly connected to upper and lower fusion surfaces of a support but is connected via a connecting surface formed at a midpoint between the upper and lower fusion surfaces, thus minimizing the deformation of the ribs due to shrinkage caused by cooling and molding processes after injection molding is performed.

DETAILED DESCRIPTION

Hereinafter, a baffle that can be assembled with a support according to a preferred aspect of the present disclosure will be described with reference to the accompanying drawings.

Figure 1:
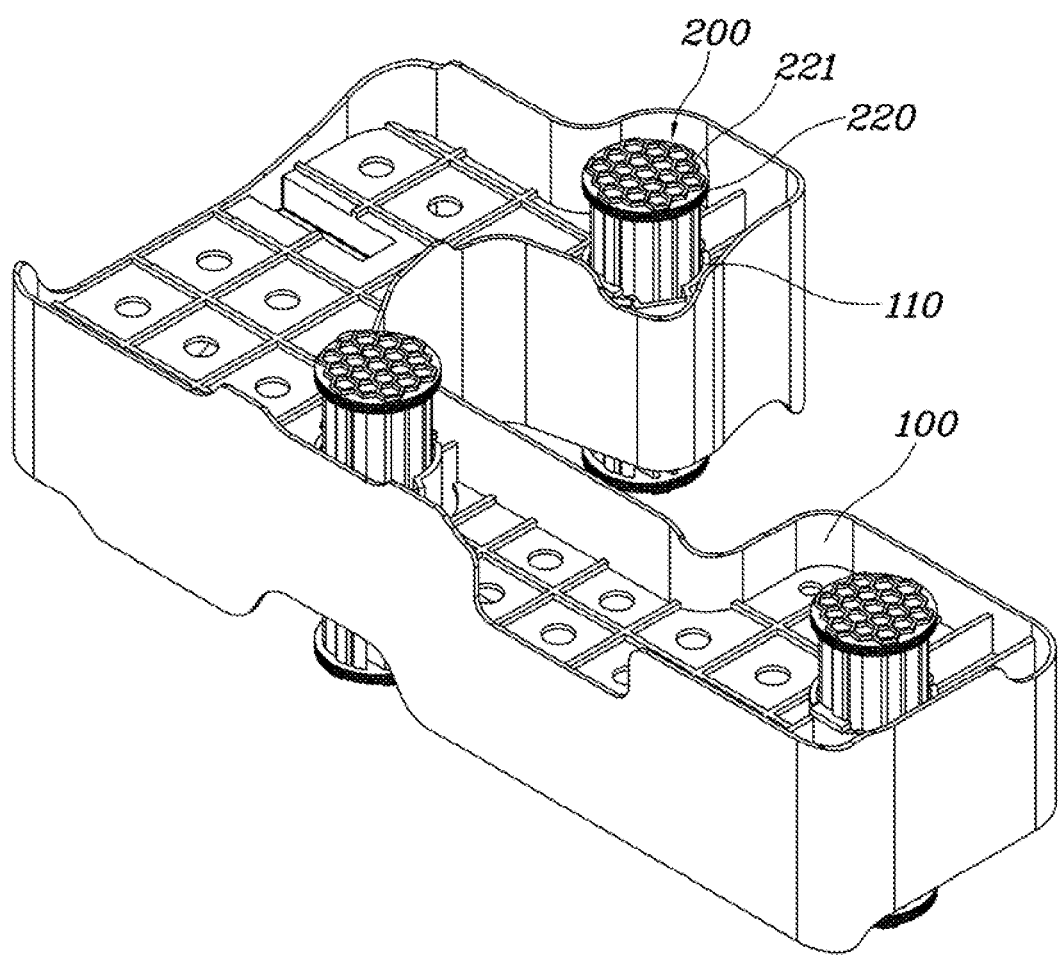
FIG. 1 is a view illustrating a state in which a support is fastened to a baffle, in the baffle that can be assembled with the support according to an embodiment of the present disclosure.
Figure 2:
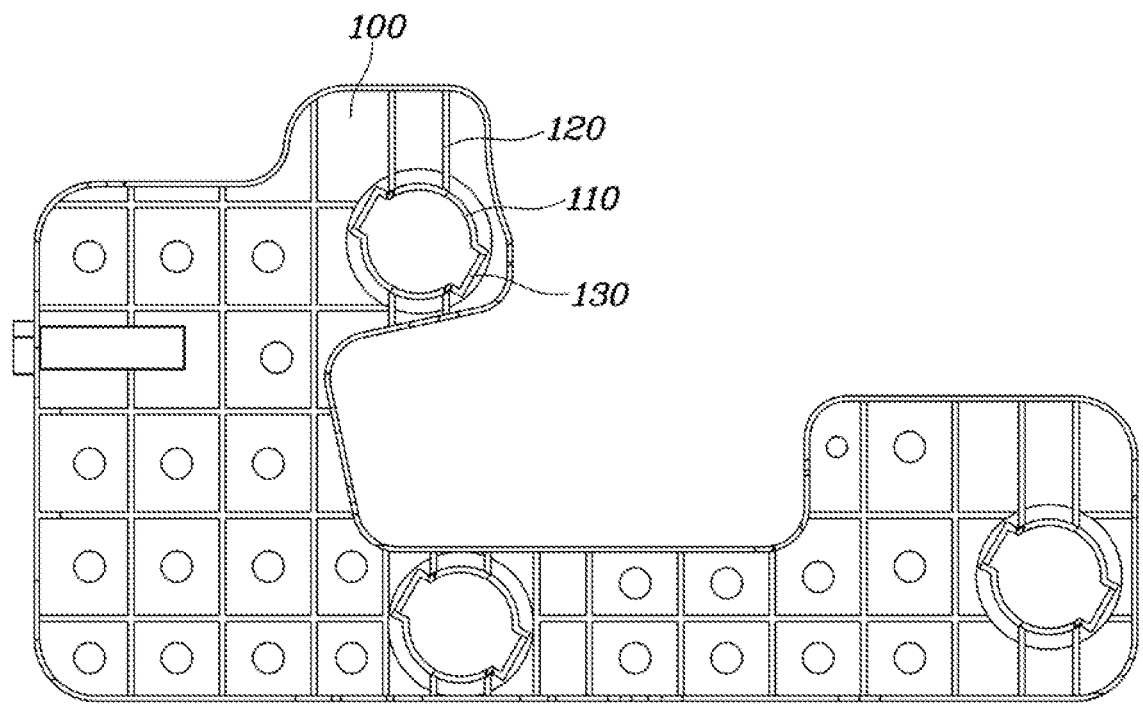
FIG. 2 is a plan view illustrating the baffle, in the baffle that can be assembled with the support according to the embodiment of the present disclosure.
Figure 3:
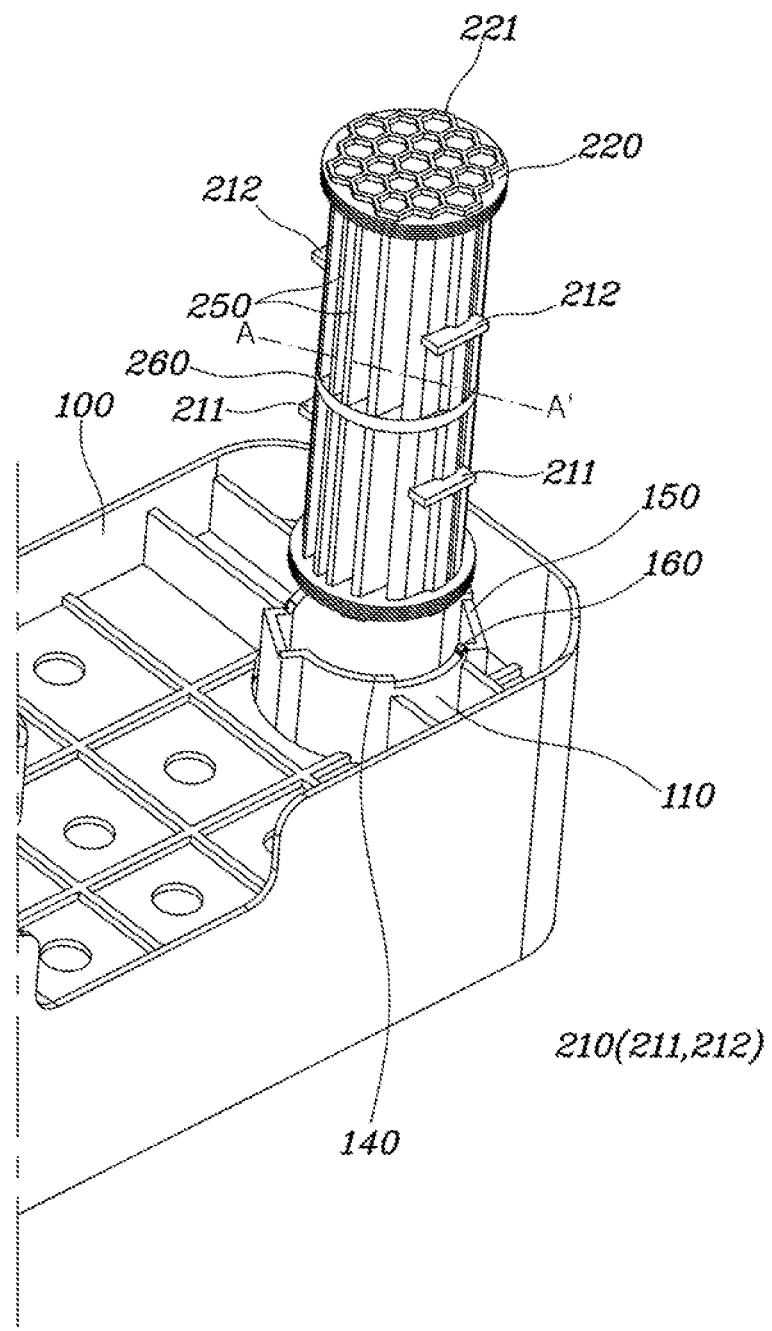
FIG. 3 is a view illustrating a state before the support is inserted into a fastening portion of the baffle, in the baffle that can be assembled with the support according to the embodiment of the present disclosure.
Figure 4:
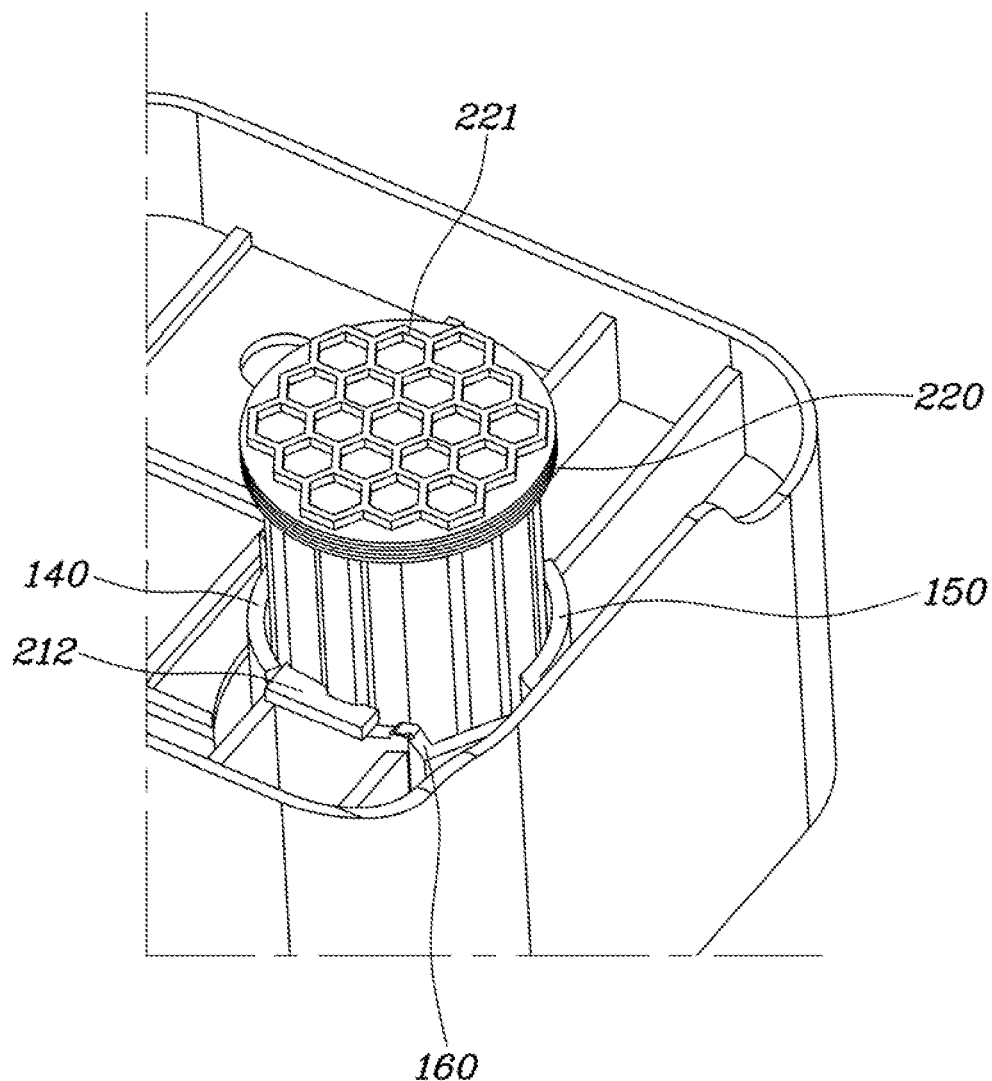
FIG. 4 is a view illustrating a state in which one end of a second wing passes over a first engagement step to be located between a first engagement step and a first engagement portion as the support is rotated before the second wing of the support is inserted into an insert groove, in the baffle that can be assembled with the support according to the embodiment of the present disclosure.
Figure 5:
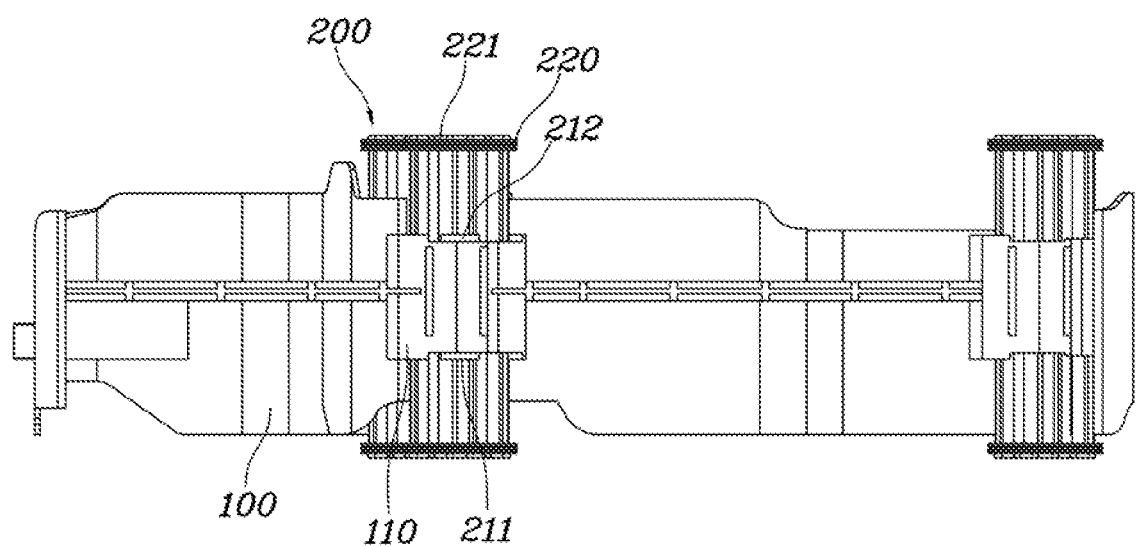
FIG. 5 is a diagram illustrating a state in which the support is fastened to the baffle when viewed from a side, in the baffle that can be assembled with the support according to the embodiment of the present disclosure.
Figure 6:
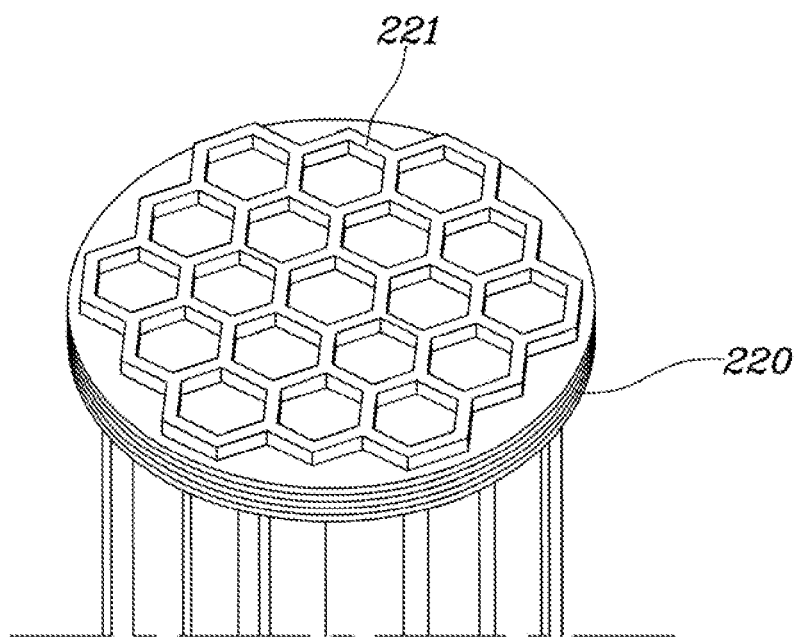
FIG. 6 is a diagram illustrating a protrusion formed on a fusion surface of the support, in the baffle that can be assembled with the support according to the embodiment of the present disclosure.
Figure 7:
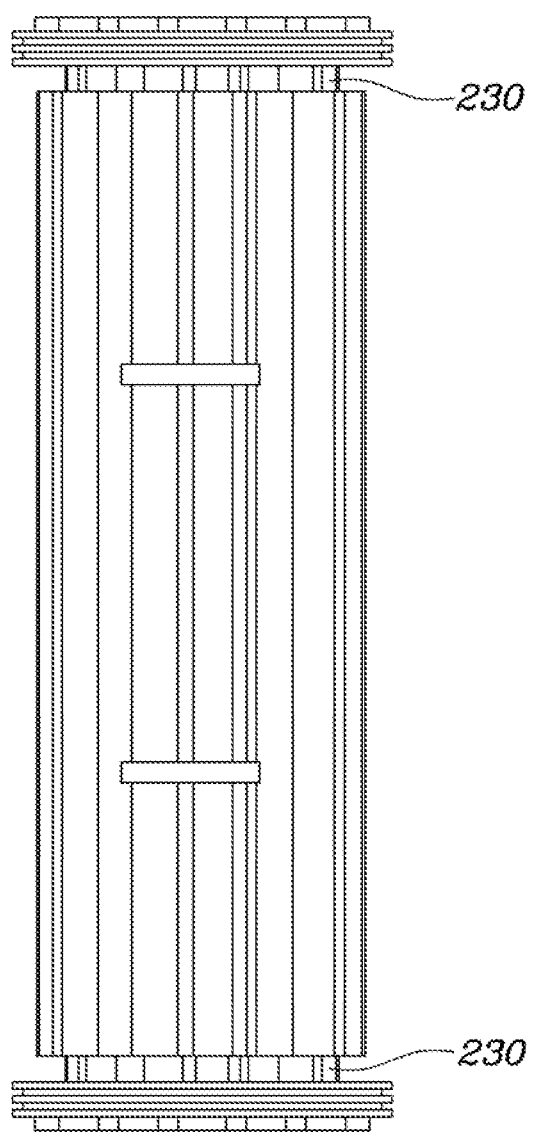
FIG. 7 is a diagram illustrating a notch that is formed in the proximity of a fusion surface fused to an inner surface of each of upper and lower portions of a tank body in the support, in the baffle that can be assembled with the support according to the embodiment of the present disclosure.
Figure 8:
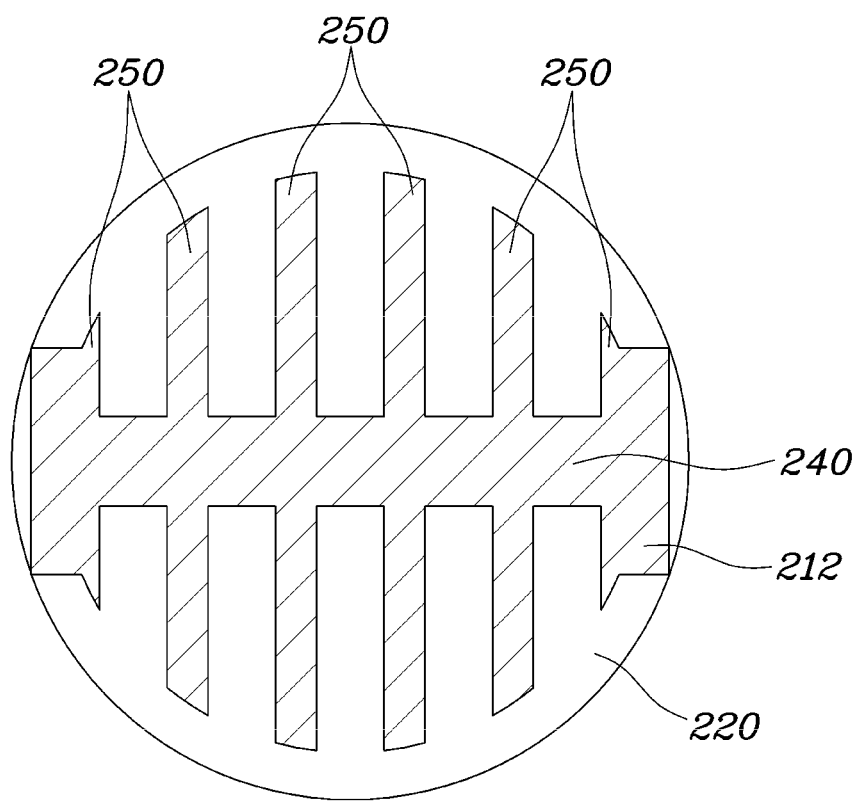
FIG. 8 is a sectional view of the support taken along line A-A' of FIG. 3.

FIG. 1 is a view illustrating a state in which a support is fastened to a baffle, in the baffle that can be assembled with the support according to an aspect of the present disclosure, FIG. 2 is a plan view illustrating the baffle, FIG. 3 is a view illustrating a state before the support is inserted into a fastening portion of the baffle, FIG. 4 is a view illustrating a state in which one end of a second wing passes over a first engagement step to be located between a first engagement step and a first engagement portion as the support is rotated before the second wing of the support is inserted into an insert groove, FIG. 5 is a diagram illustrating a state in which the support is fastened to the baffle when viewed from a side, FIG. 6 is a diagram illustrating a protrusion formed on a fusion surface of the support, FIG. 7 is a diagram illustrating a notch that is formed in the proximity of a fusion surface fused to an inner surface of each of upper and lower portions of a tank body in the support, and FIG. 8 is a sectional view of the support taken along line A-A' of FIG. 3.

As shown in FIG. 1, the baffle that can be assembled with the support according to an aspect of the present disclosure may include a baffle body 100 in which a plurality of through holes is formed to be spaced apart from each other and a fastening portion 110 is formed on an inner circumferential surface of the through hole, and a support 200 which has on an outer circumferential surface of the support 200, an engagement portion 210 to be coupled to the fastening portion 110, so that the support 200 is fastened to the baffle body 100 while passing through the baffle body 100, is secured at both ends thereof to opposite sides on an inner surface of a tank, and supports the tank to maintain the shape of the inner space of the tank.

The baffle body 100 may be installed in the inner space of the tank for a vehicle, and serves to reduce flow noise. As shown in FIG. 2, the plurality of through holes may be formed in the baffle body 100, and the fastening portion 110 may be formed in each through hole. According to the present disclosure, the plurality of through holes is formed in the baffle body 100, the fastening portion 110 is formed in each through hole, and the support 200 is inserted into the fastening portion 110 to fasten the baffle body 100 and the support 200 to each other, thus allowing the support 200 to be more freely installed at a desired position in a tank body.

Meanwhile, the fastening portion 110 may be located in the through hole to be spaced apart from the through hole. The fastening portion has the shape of a cylinder in which a hollow portion is formed. When the support 200 is inserted, the fastening portion may surround the support 200 and be engaged to the engagement portion 210 of the support 200.

In addition, the baffle body 100 may further include a connecting portion 120 that is connected at one end of the connecting portion 210 to an outer surface of the fastening portion 110 and extends at the other end to the baffle body 100 to be connected to an inner surface of the through hole, thus connecting the fastening portion 110 and the baffle body 100. Here, the other end of the connecting portion 120 may be connected to the inner surface of the through hole, and further extend to an edge of the baffle body 100. According to the present disclosure, the fastening portion 110 is not formed along the through hole of the baffle body 100 but is formed to be spaced apart from the through hole by a predetermined distance, and the fastening portion 110, the through hole, and the baffle body 100 are connected via the connecting portion 120, thus preventing the fastening portion 110 from being deformed due to shrinkage caused by cooling and molding processes after injection molding is performed rather than when the fastening portion 100 is formed along the through hole by injection molding.

Furthermore, in order to allow a wing of the support 200 to be inserted when the support 200 is inserted into the fastening portion 110, an insert groove 130 corresponding to the shape of the wing may extend from an upper surface of the fastening portion 110 to a lower surface thereof. To be more specific, a first engagement portion 140 may be formed on an upper surface of the fastening portion 110 to protrude upwards, and a second engagement portion 150 may be formed along the hollow portion of the fastening portion 110 to be spaced apart from the first engagement portion 140, and a first engagement step 160 may be formed between the first engagement portion 140 and the second engagement portion 150. Moreover, although not shown in the drawings, a third engagement portion may be formed on a lower surface of the fastening portion 110 to protrude downwards, a fourth engagement portion may be formed along the hollow portion of the fastening portion to be spaced apart from the third engagement portion, and a second engagement step may be formed between the third engagement portion and the fourth engagement portion.

Meanwhile, the fastening portion 110 may be shaped to extend in a longitudinal direction of the support 200, and the extending length of the fastening portion 110 may be the same as a distance between the first wing 211 and the second wing 212 that will be described later.

The support 200 may extend in a vertical direction of the vehicle to have a columnar shape, and be fitted into the through hole of the baffle body 100 to pass through the through hole. The engagement portion 210 formed on the outer circumferential surface of the support 200 may be engaged to the fastening portion 110, so that the support 200 may be fastened to the baffle body 100. Referring to FIG. 3, the engagement portion 210 of the support 200 may be composed of a plurality of wings that protrudes in opposite directions from opposite sides on an outer surface of the support 200. To be more specific, the engagement portion 210 may include a plurality of first wings 211 formed at a predetermined height of the support 200, and a plurality of second wings 212 formed at a height to be spaced apart from the first wings 211. Hereinafter, a process of engaging and fastening the support 200 to the baffle body 100 will be described in detail with reference to FIGS. 3 to 5.

As the plurality of wings formed on the outer surface of the support 200 is inserted into the insert grooves 130 formed in the fastening portion 110, the wings may be inserted into the hollow portion of the fastening portion 110. To be more specific, first, the plurality of first wings 211 of the support 220 is inserted into the insert grooves 130. Here, before the second wings 212 of the support are inserted into the insert grooves 130, the support 200 may be rotated. As the support 200 rotates, as shown in FIG. 4, one end of the second wing 212 passes over the first engagement step 160 to be located between the first engagement step 160 and the first engagement portion 140, and the other end is located between the first engagement portion 140 and the second engagement portion 150, so that the support 200 may be fastened to the baffle body 100. Here, as the support 200 rotates, one end of the first wing 211 inserted into the insert groove 130 passes over a second engagement step (not shown) to be located between the second engagement step and a third engagement portion (not shown), and the other end is located between the third engagement portion (not shown) and a fourth engagement portion (not shown), so that the support 200 may be fastened to the baffle body 100. That is, according to the above-described method, the plurality of wings formed on the outer surface of the support 200 may be located between the first engagement portion 140, the second engagement portion 150, the first engagement step 160, the third engagement portion, the fourth engagement portion, and the second engagement step of the fastening portion 110, so that the support 200 may be engaged and fastened to the baffle body 100, as shown in FIG. 5.

In addition, after the support 200 and the baffle body 100 are fastened as described above, the plurality of wings of the support 200 may be located between the first engagement portion 140, the second engagement portion 150, the first engagement step 160, the third engagement portion, the fourth engagement portion, and the second engagement step of the fastening portion 110, thus preventing the support 200 from being rotated. Furthermore, after the support 200 and the baffle body 100 are fastened to each other, as shown in FIG. 5, the first wing 211 and the second wing 212 of the support 200 are engaged to the lower surface and the upper surface of the fastening portion 110, thus preventing the support 200 from moving up and down.

Meanwhile, fusion surfaces 220 may be formed on upper and lower ends of the support 200 to be fixedly fused to opposite sides of the inner surface of the tank, and a protrusion 221 may be formed on each fusion surface 220 as shown in FIG. 6. Here, the shape of the protrusion 221 formed on the fusion surface 220 shown in FIG. 6 is only an example. The protrusion according to the present disclosure is not limited to a specific shape, and may have various shapes.

According to an embodiment, as shown in FIG. 7, concave notches 230 may be formed along an edge of the support 220 at a lower point of the fusion surface 220 formed on the upper end of the support 200 and an upper point of the fusion surface 220 formed on the lower end of the support 200. As such, according to the present disclosure, the fusion surfaces of the upper and lower ends of the support 200 are fixedly fused to the opposite sides of the inner surface of the tank, respectively, thus supporting the tank to maintain the shape of the inner space of the tank. The notch is formed at a point adjacent to each fusion surface of the support 200, so that the rigidity of a portion in which the support 200 and the tank are fixedly fused is higher than that of the tank, thus preventing the tank from being cracked by external shocks and overpressure.

Meanwhile, a core 240 may be formed between the upper and lower fusion surfaces 220 of the support 200 to connect the upper and lower fusion surfaces 220. To be more specific, referring to FIG. 8, a plurality of ribs 250 may be formed on opposite sides of the core 240 in a longitudinal direction of the support 200 to protrude in opposite directions. Here, the ribs 250 may be arranged in parallel to be spaced apart from each other. As such, the ribs 250 are formed on the core 240 to be arranged in parallel and spaced apart from each other, so that the injection molding can be more easily performed when the injection molding is performed in a slide core manner.

Furthermore, one end of each of the ribs 250 may be connected to the lower side of the fusion surface 220 formed on the upper end of the support 200, while the other end may be connected to the upper side of the fusion surface 220 formed on the lower end of the support 200.

Meanwhile, a connecting surface 260 may be formed at a midpoint between the upper and lower fusion surfaces 220 of the support 200, and the ribs 250 may be connected to the upper and lower sides of the connecting surface 260. As such, according to the present disclosure, the plurality of ribs is not directly connected to the upper and lower fusion surfaces of the support 200 but is connected via the connecting surface formed at the midpoint between the upper and lower fusion surfaces, thus minimizing the deformation of the ribs due to the shrinkage caused by the cooling and molding processes after the injection molding is performed.

As described above, according to the present disclosure, a plurality of through holes is formed in a baffle body, a fastening portion is formed in each through hole, and the baffle body and the support are fastened to each other by inserting the support into the fastening portion, so that the support can be freely installed at a desired position in a tank body, whereby the work efficiency of assembling the baffle with the support can be improved.

Furthermore, according to the present disclosure, a fastening portion is not formed along a through hole of a baffle body but is formed to be spaced apart from the through hole by a predetermined distance, and the fastening portion, the through hole, and the baffle body are connected to each other via a connecting portion, thus preventing the fastening portion from being deformed due to shrinkage caused by cooling and molding processes after injection molding is performed.

In addition, according to the present disclosure, a notch is formed at a point adjacent to a fusion surface of a support, so that the rigidity of a portion in which the support and a tank are fixedly fused is higher than that of the tank, thus preventing the tank from being cracked by external shocks and overpressure.

Moreover, according to the present disclosure, a plurality of ribs is not directly connected to upper and lower fusion surfaces of a support but is connected via a connecting surface formed at a midpoint between the upper and lower fusion surfaces, thus minimizing the deformation of the ribs due to shrinkage caused by cooling and molding processes after injection molding is performed.

The invention claimed is:

1. A baffle that can be assembled with a support, the baffle comprising:
   a baffle body installed in an inner space of a tank for a vehicle to reduce flow noise, and having a plurality of through holes that are spaced apart from each other, with a fastening portion being formed on an inner circumferential surface of each of the through holes; and
   a support having a columnar shape, the support being fitted into a through hole to pass through the through hole, the support having on an outer circumferential surface of the support body, an engagement portion that is coupled to the fastening portion, so that the support is fastened to the baffle body while passing through the baffle body, the support being secured at both ends thereof to opposite sides of an inner surface of the tank, respectively, thereby supporting the tank to maintain a shape of the inner space of the tank;
   wherein the engagement portion comprises a plurality of wings formed at opposite sides on an outer surface of the support to protrude in opposite directions;
   wherein the engagement portion comprises a plurality of first wings formed at a predetermined height of the support, and a plurality of second wings formed at a height that is spaced apart from the first wings;
   wherein, in order to allow the wings of the support to be inserted when the support is inserted into the fastening portion, an insert groove corresponding to a shape of each of the wings extends from an upper surface of the fastening portion to a lower surface of the fastening portion, and wherein, as the support rotates before the second wing of the support is inserted into the insert groove, a first end of the second wing passes over the first engagement step to be located between the first engagement step and the first engagement portion, and a second end of the second wing is located between the first engagement portion and the second engagement portion, so that the support is fastened to the baffle body.

2. The baffle of claim 1, wherein the fastening portion is located in the through hole and has a shape of a cylinder in which a hollow portion is formed, and wherein the fastening portion surrounds the support to be fixedly engaged to the engagement portion when the support is inserted.

3. The baffle of claim 1, wherein the fastening portion is located in the through hole and spaced apart from ends of the through hole, and the baffle further comprising:

a connecting portion connected at a first end thereof to an outer surface of the fastening portion and extending at a second end thereof to the baffle body to be connected to an inner surface of the through hole, thus connecting the fastening portion and the baffle body.

4. The baffle of claim 3, wherein the second end of the connecting portion is connected to the inner surface of the through hole, and extends to an edge of the baffle body.

5. The baffle of claim 1, wherein the fastening portion is shaped to extend in a longitudinal direction of the support, and wherein an extending length of the fastening portion is equal to a distance between the first and second wings.

6. The baffle of claim 1, wherein, in order to allow the wings of the support to be inserted when the support is inserted into the fastening portion, an insert groove corresponding to a shape of each of the wings extends from an upper surface of the fastening portion to a lower surface of the fastening portion.

7. The baffle of claim 1, wherein a first engagement portion is formed on an upper surface of the fastening portion to protrude upwards, a second engagement portion is formed along a hollow portion of the fastening portion to be spaced apart from the first engagement portion, and a first engagement step is formed between the first engagement portion and the second engagement portion.

8. The baffle of claim 7, wherein a third engagement portion is formed on a lower surface of the fastening portion to protrude downwards, a fourth engagement portion is formed along the hollow portion of the fastening portion to be spaced apart from the third engagement portion, and a second engagement step is formed between the third engagement portion and the fourth engagement portion.

9. The baffle of claim 1, wherein, as the support rotates, a first end of the first wing of the support passes over a second engagement step to be located between the second engagement step and a third engagement portion, and a second end of the first wing is located between the third engagement portion and a fourth engagement portion, so that the support is fastened to the baffle body.

10. The baffle of claim 1, wherein, after the support and the baffle body are fastened to each other, the wings of the support are located between the engagement steps of the fastening portion and the plurality of engagement portions, thus preventing the support from being rotated.

11. The baffle of claim 1, wherein, after the support and the baffle body are fastened to each other, the first and second wings of the support are engaged to the lower surface and the upper surface of the fastening portion, thus preventing the support from moving up and down.

12. The baffle of claim 1, wherein fusion surfaces are formed on upper and lower ends of the support, respectively, to be fixedly fused to opposite sides of the inner surface of the tank.

13. The baffle of claim 12, wherein a protrusion is formed on each of the fusion surfaces of the support.

14. The baffle of claim 12, wherein concave notches are formed along an edge of the support at a lower point of the fusion surface formed on an upper end of the support and an upper point of the fusion surface formed on a lower end of the support.

15. The baffle of claim 12, wherein the support extends in a vertical direction of the vehicle, and the fusion surfaces of the support are fixedly fused to inner surfaces of upper and lower portions of the tank.

16. The baffle of claim 12, wherein a core is formed between the upper and lower fusion surfaces of the support to connect the upper and lower fusion surfaces.

17. The baffle of claim 16, wherein a connecting surface is formed at a midpoint between the upper and lower fusion surfaces of the support, and a plurality of ribs is connected to upper and lower sides of the connecting surface.

18. The baffle of claim 16, wherein a plurality of ribs is formed on opposite sides of the core in a longitudinal direction of the support to protrude in opposite directions.

19. The baffle of claim 18, wherein the plurality of ribs is arranged in parallel and spaced apart from each other.

20. The baffle of claim 18, wherein a first end of each of the ribs is connected to a lower side of the fusion surface formed on the upper end of the support, and a second end of each of the ribs is connected to an upper side of the fusion surface formed on the lower end of the support.

* * * * *